United States Patent
Kops et al.

(10) Patent No.: US 8,424,409 B2
(45) Date of Patent: Apr. 23, 2013

(54) SHIFTER WITH ONE-TOUCH ASSEMBLY

(75) Inventors: William R. Kops, Ravenna, MI (US); Lee H. Karner, Holland, MI (US)

(73) Assignee: GHSP, Inc., Grand Haven, MI (US)

( * ) Notice: Subject to any disclaimer, the term of this patent is extended or adjusted under 35 U.S.C. 154(b) by 884 days.

(21) Appl. No.: 12/493,646

(22) Filed: Jun. 29, 2009

(65) Prior Publication Data

US 2010/0000359 A1 Jan. 7, 2010

Related U.S. Application Data

(60) Provisional application No. 61/077,268, filed on Jul. 1, 2008.

(51) Int. Cl.
*B60K 20/00* (2006.01)
(52) U.S. Cl.
USPC ........................................................ 74/473.1
(58) Field of Classification Search .................. 74/473.3, 74/473.1, 553
See application file for complete search history.

(56) References Cited

U.S. PATENT DOCUMENTS

| | | | |
|---|---|---|---|
| 1,091,212 A | 3/1914 | Gregory | |
| 1,130,726 A | 3/1915 | Greve | |
| 1,156,272 A | 10/1915 | Cass | |
| 1,199,690 A | 9/1916 | Gillan | |
| 1,294,304 A | 2/1919 | Pittman | |
| 1,887,640 A | 11/1932 | Hickman | |
| 1,894,204 A | 1/1933 | Steele | |
| 1,998,639 A | 4/1935 | Roberts | |
| 2,013,962 A | 9/1935 | Hutchens | |
| 2,060,523 A | 11/1936 | Packer | |
| 2,527,256 A | 10/1950 | Jackson | |
| 2,574,330 A * | 11/1951 | Judd | ............................. 403/107 |
| 2,601,088 A | 6/1952 | Burgess | |
| 2,636,070 A | 4/1953 | Judisch | |
| 2,846,036 A | 8/1958 | Maurice et al. | |
| 2,945,100 A | 7/1960 | Maurice et al. | |
| 3,073,918 A | 1/1963 | Tarbox | |
| 3,126,242 A | 3/1964 | Herman | |
| 3,198,922 A | 8/1965 | Rohacs | |
| 3,386,308 A | 6/1968 | Butler | |
| 3,401,574 A | 9/1968 | Doolittle | |
| 3,423,781 A | 1/1969 | Henson | |
| 3,561,281 A | 2/1971 | Wilfert | |
| 3,657,943 A | 4/1972 | Bruh, Jr. et al. | |
| 3,699,613 A * | 10/1972 | Skinner | ........................... 16/441 |
| 3,707,886 A | 1/1973 | Flodin | |

(Continued)

FOREIGN PATENT DOCUMENTS

| | | |
|---|---|---|
| DE | 4209930 A1 | 9/1993 |
| DE | 4320591 A1 | 1/1995 |

(Continued)

*Primary Examiner* — Justin Krause
(74) *Attorney, Agent, or Firm* — Price Heneveld LLP

(57) ABSTRACT

A shifter assembly includes a post-like shift lever, a knob with a bore configured to receive the top section, and a retainer spring extending longitudinally within the bore. The spring includes retainer barbs shaped to frictionally grip the knob and further has a leg(s) configured to frictionally engage the top section and also take up clearance between the top section and the bore for frictionally engaging the post-like shift lever. The spring can be alternative shapes, such as U-shaped or L-shaped. A method of assembly includes pressing the knob onto a shift lever with a single one-touch motion.

19 Claims, 3 Drawing Sheets

U.S. PATENT DOCUMENTS

| | | |
|---|---|---|
| 3,790,729 A | 2/1974 | Bradshaw |
| 3,899,934 A | 8/1975 | Froumajou |
| 3,998,110 A | 12/1976 | O'Brien et al. |
| 4,057,701 A | 11/1977 | Sisk et al. |
| 4,106,311 A | 8/1978 | Euler |
| 4,144,424 A | 3/1979 | Takeda et al. |
| 4,183,424 A | 1/1980 | Rumyantsev et al. |
| 4,207,794 A | 6/1980 | Collister |
| 4,235,299 A | 11/1980 | Reynolds |
| 4,473,923 A | 10/1984 | Neroni et al. |
| 4,492,129 A | 1/1985 | Hasegawa |
| 4,505,058 A | 3/1985 | Peterson |
| 4,518,162 A | 5/1985 | Oates |
| 4,598,606 A | 7/1986 | Foggini |
| 4,603,598 A | 8/1986 | Tsuji et al. |
| 4,641,597 A | 2/1987 | Paxton |
| 4,661,009 A | 4/1987 | Tripp |
| 4,724,718 A | 2/1988 | Foggini |
| 4,787,117 A | 11/1988 | Westergren |
| 4,791,826 A | 12/1988 | Behrens |
| 4,862,760 A | 9/1989 | Kuwahara et al. |
| 4,883,349 A | 11/1989 | Mittelhauser |
| 4,943,182 A | 7/1990 | Hoblingre |
| 4,982,619 A | 1/1991 | Thoreson |
| 5,012,888 A | 5/1991 | MacInnis |
| 5,033,324 A | 7/1991 | Glaser |
| 5,094,464 A | 3/1992 | Musacchia, Sr. |
| 5,161,422 A | 11/1992 | Suman et al. |
| 5,172,603 A | 12/1992 | MacInnis |
| 5,182,694 A | 1/1993 | Endo |
| 5,189,925 A | 3/1993 | Neal et al. |
| 5,211,078 A | 5/1993 | McCarthy et al. |
| D338,472 S | 8/1993 | Patterson et al. |
| 5,247,849 A | 9/1993 | Sato |
| 5,305,660 A | 4/1994 | Hasegawa |
| 5,309,783 A | 5/1994 | Doolittle et al. |
| 5,313,853 A | 5/1994 | Olmsted et al. |
| 5,345,836 A | 9/1994 | Yokoyama et al. |
| 5,372,051 A | 12/1994 | Kanematsu et al. |
| 5,409,403 A | 4/1995 | Falossi et al. |
| 5,458,017 A | 10/1995 | Kanematsu et al. |
| 5,501,120 A | 3/1996 | Kikuchi et al. |
| 5,513,622 A | 5/1996 | Musacchia, Sr. |
| 5,556,224 A | 9/1996 | Niskanen |
| 5,575,174 A | 11/1996 | Kanematsu et al. |
| 5,579,661 A | 12/1996 | Yarnell et al. |
| 5,588,329 A | 12/1996 | Nedachi |
| 5,592,749 A | 1/1997 | Trimmer |
| 5,606,892 A | 3/1997 | Hedderly |
| 5,617,760 A | 4/1997 | Woeste et al. |
| 5,624,266 A | 4/1997 | Gibbs et al. |
| 5,706,701 A | 1/1998 | Murakami |
| 5,727,423 A | 3/1998 | Torii et al. |
| 5,735,177 A | 4/1998 | Crack |
| 5,873,749 A | 2/1999 | Takiguchi et al. |
| 5,880,422 A | 3/1999 | Sato et al. |
| 5,883,348 A | 3/1999 | Yokoyama |
| 5,884,530 A | 3/1999 | Sato et al. |
| 5,893,298 A | 4/1999 | Keister |
| 5,936,215 A | 8/1999 | Masuda et al. |
| 5,957,001 A | 9/1999 | Gualtieri et al. |
| 5,992,261 A | 11/1999 | Iwata et al. |
| 6,023,032 A | 2/2000 | Nakamura et al. |
| 6,029,535 A | 2/2000 | Kenny et al. |
| 6,038,937 A | 3/2000 | Van Order et al. |
| 6,038,939 A | 3/2000 | Wheeler |
| 6,058,797 A | 5/2000 | Konig et al. |
| 6,065,988 A | 5/2000 | Kubota |
| 6,082,216 A | 7/2000 | Watanabe et al. |
| 6,116,370 A | 9/2000 | Puigbo |
| 6,145,401 A | 11/2000 | Brush et al. |
| 6,354,843 B1 | 3/2002 | Kato |
| 6,406,334 B2 | 6/2002 | Chu |
| 6,421,881 B1 | 7/2002 | Shovlin |
| 6,437,264 B1 | 8/2002 | Mizuta et al. |
| 6,670,564 B2 | 12/2003 | Naito et al. |
| 6,675,670 B2 | 1/2004 | Fujiwara et al. |
| 6,705,180 B2 | 3/2004 | Arakawa et al. |
| 6,904,827 B2 | 6/2005 | Arakawa et al. |
| 2002/0117018 A1 | 8/2002 | Fujiwara et al. |
| 2002/0139219 A1 | 10/2002 | Arakawa et al. |
| 2006/0021462 A1 | 2/2006 | Shioji |

FOREIGN PATENT DOCUMENTS

| | | |
|---|---|---|
| EP | 0 342 174 | 11/1989 |
| EP | 0 399 896 A1 | 11/1990 |
| EP | 0629526 A1 | 12/1994 |
| FR | 2707721 A1 | 1/1995 |
| JP | 58105316 | 6/1983 |
| JP | 03089064 A | 4/1991 |
| JP | 07019323 A | 1/1995 |
| JP | 08303561 A | 11/1996 |
| JP | 10016592 A | 1/1998 |

\* cited by examiner

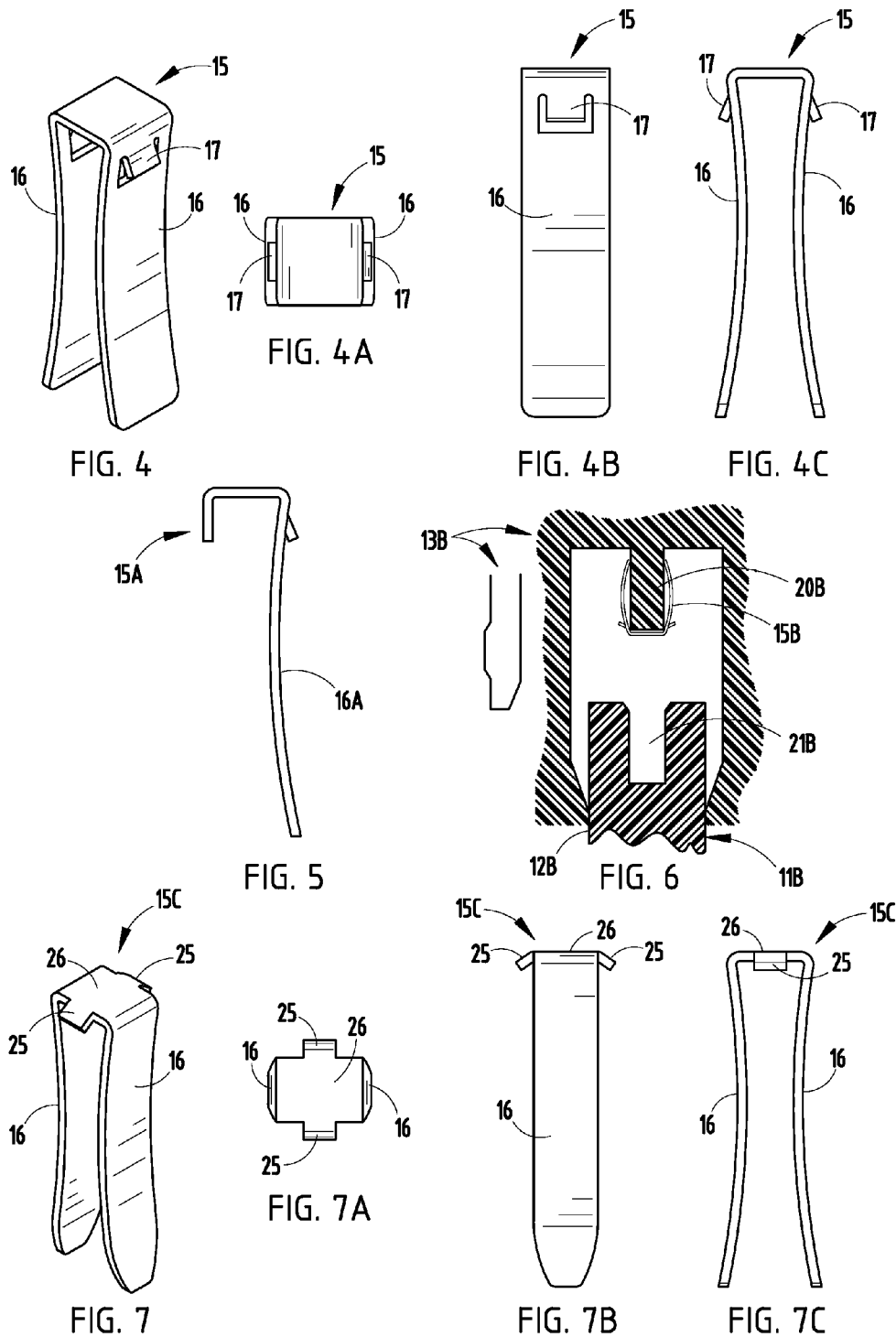

US 8,424,409 B2

SHIFTER WITH ONE-TOUCH ASSEMBLY

This application claims benefit under 35 U.S.C. §119(e) of provisional application Ser. No. 61/077,268, filed Jul. 1, 2008, titled SHIFTER WITH ONE-TOUCH ASSEMBLY.

BACKGROUND

The present invention relates to shifters having a knob adapted for "one-touch" assembly, which facilitates assembly of the knob to the shifter post with a simple motion and without the need for secondary operations.

The automotive industry is extremely competitive, and as a result minimizing the cost of components and assembly time are very important, along with maintaining high quality and visual standards of the final product. This is especially true for items that the consumer touches and sees every time they ride in and/or drive a vehicle. Shifters are one such item. In fact, shifter knobs are often an "identity" item in a vehicle. This leads to very high standards in terms of high visual and "feel" standards, along with high standards for durability and robustness of assembly, low cost (including components and assembly time), and consistency and ease of assembly. At the same time, it is important that a shifter be configured for assembly at remote locations, so that component decisions can be made at the last possible time (which helps minimize product inventories and gives consumers maximum choice). However, this "last minute flexibility" must be done potentially without sacrificing quality.

As a result of the above, there is room for improvement in known existing shifter designs. For example, many known shifters have knobs that attach with separate fasteners and that are visible, creating a poor appearance. Others have hidden attachment, but require costly components, "too many" components, and/or more assembly labor than is desired. Further, many known shifter designs are capable of being misassembled, which creates poor appearance and potentially loose shifter knobs (which consumers interpret as poor quality).

SUMMARY OF THE PRESENT INVENTION

In one aspect of the present invention, a shifter assembly includes a shifter having a shift lever with top section. A knob with a bore is configured to receive the top section for mounting thereon. A spring is configured to fit within the bore and grip a material of the knob and extend longitudinally, the spring having at least one leg portion configured to flex and take up clearance between an outer surface of the top section and an inner surface of the bore, and to provide frictional retention of the knob to the shift lever.

In narrower aspects, the spring has at least one long bowed resilient leg and is L-shaped or U-shaped. The spring has barbs that engage the plastic of the knob and is configured to hold itself within the bore and also to frictionally hold itself to the top section of the lever. The knob has a lower portion that defines the bore including a top portion for receiving the spring and a lower portion that extends below the spring for more stably engaging the top section of the shift lever.

In another aspect of the present invention, a knob is configured to be mounted to a shifter having a shift lever with a top section. The knob includes a bore configured to receive the top section for mounting thereon and a spring fit longitudinally within the bore. The spring has retainers shaped to frictionally engage and grip a material of the knob and further has at least one leg portion configured to flex and take up clearance between an outer surface of the top section and an inner surface of the bore, and to provide frictional retention of the knob to the shift lever.

In another aspect of the present invention, a method of assembling a knob onto a shift lever comprises steps of providing a shifter having a shift lever with a top section. A knob is provided with a bore configured to receive the top section for mounting thereon. A spring is secured to one of the top section and the knob, with the spring being configured to fit within the bore and grip a material of the knob and extend longitudinally. The spring has at least one leg portion configured to flex and take up clearance between an outer surface of the top section and an inner surface of the bore to thus provide frictional retention of the knob to the shift lever. The method further includes motivating with a single assembly motion the knob and shift lever together so that the top section is positioned in the bore with the spring retaining the knob and shift lever together.

These and other aspects, objects, and features of the present invention will be understood and appreciated by those skilled in the art upon studying the following specification, claims, and appended drawings.

BRIEF DESCRIPTION OF DRAWINGS

FIGS. 4-4C are perspective and orthogonal views of the retainer spring in the assembled knob and post.

FIG. 5 is a side view of an alternative spring design.

FIG. 6 is an enlarged cross-sectional view of a modified knob and lever assembly during assembly similar to FIG. 3, but shown partially assembled.

FIGS. 7-7C are perspective and orthogonal views of another retainer spring for the assembled knob and post.

DETAILED DESCRIPTION OF PREFERRED EMBODIMENTS

Figure 1:
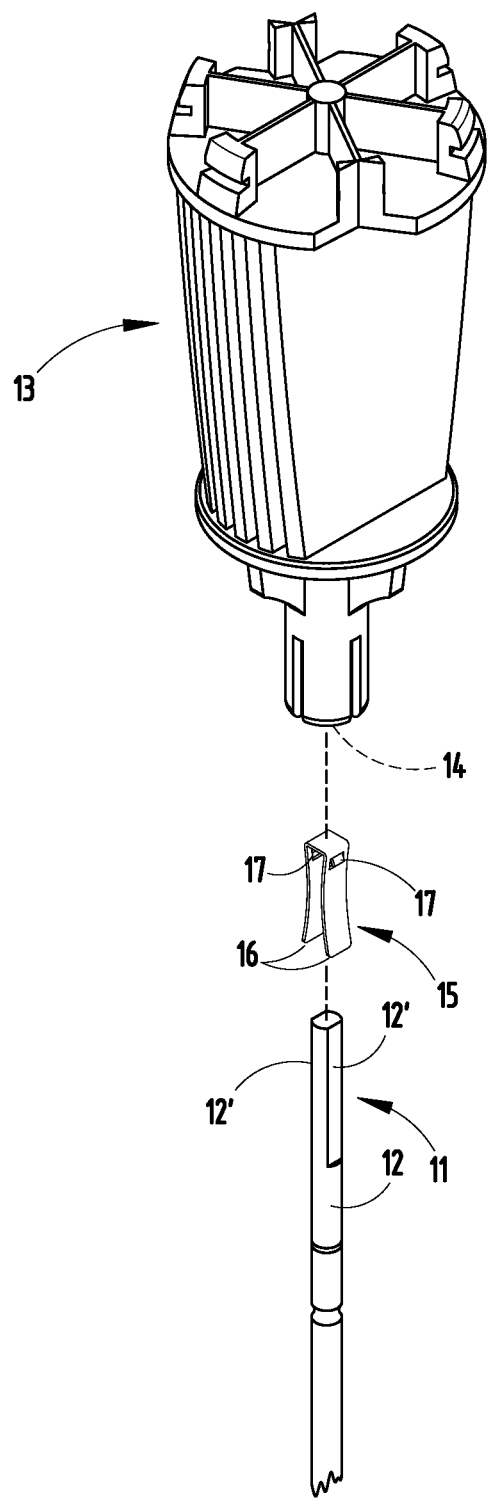
FIG. 1 is a telescopingly-exploded perspective view showing components for assembly of a knob to a top of a shift lever including a retainer spring.
Figure 2:
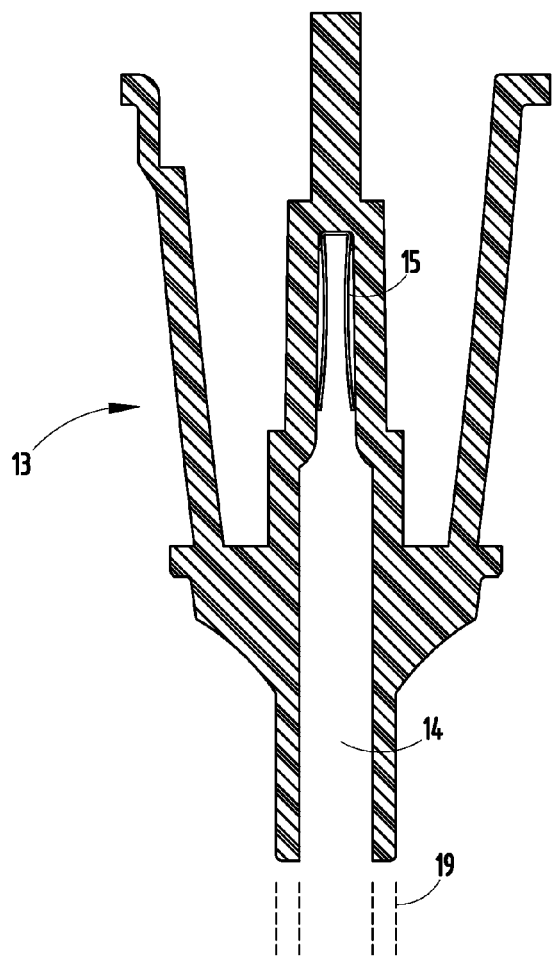
FIGS. 2-3 are cross-sectional views of the knob before and after assembly, respectively.
Figure 3:
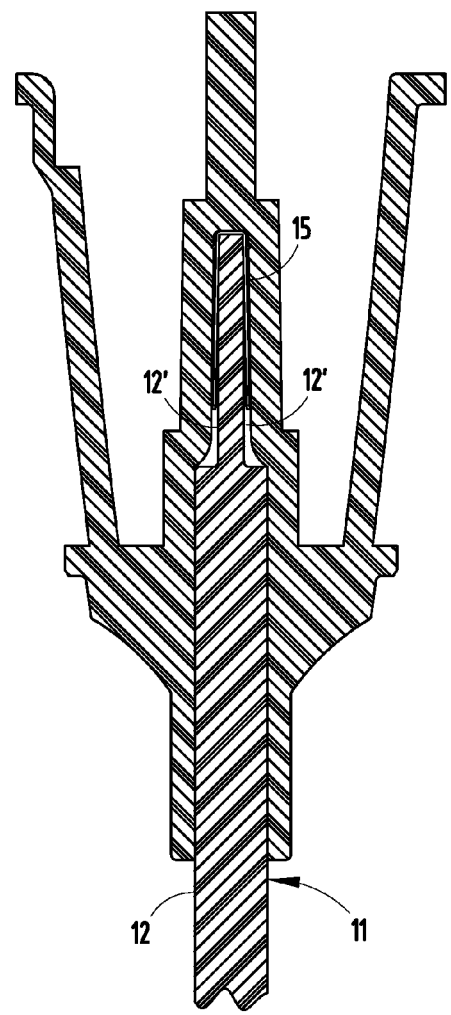

A shifter assembly 10 (FIG. 1) includes a shifter having a shift lever 11 with a top section 12. A knob 13 with a bore 14 is configured to receive the top section 12 for mounting thereon. A retainer spring 15 is configured to fit within the bore 14 and grip a material of the knob 13. The spring 15 extends longitudinally and has two leg portions 16 (FIG. 1) (or alternatively a spring 13A with one leg portion 16A, FIG. 6). The leg portion 16 is configured to flex and take up clearance between an outer surface of the top section 12 and an inner surface of the bore 14, and to provide frictional retention of the knob 13 to the shift lever 11. The retention force provided by the spring 15 is distributed, which helps both in terms of minimizing a tendency of the plastic to creep and also minimizes a tendency of the knob 13 to feel loose or "tippy" on the shift lever 11 (i.e., "lash"). Further, the spring 15 is designed to provide a relatively easy low-force assembly (such as 15 pounds force or about 70N), yet a high-force of removal (such as 4-10 times the installation force) and a very positive retention by engaging opposing flats 12' on the top section 12.

It is contemplated that alternative spring designs are within a scope of the present invention. The illustrated spring 15 is stamped from spring steel to have a U-shape (FIGS. 4-4C) (or L-shaped, see FIG. 5) and has at least one long bowed resilient leg 16. The U-shaped retainer spring 15 further has outwardly-bent barbs or retainers 17 extending at an acute angle from the material of the leg 16 and oriented to engage the plastic of the knob 13. By this arrangement, the barb(s) are configured to hold the spring 15 within the bore 14. A shape of the leg portions 16 of the U-shaped spring 15 also frictionally holds the spring 15 to the top section of the lever 11. Thus, the spring 15 can be pre-inserted into the bore 14 of the knob 13, or alternatively pre-assembled to the top section 12.

The illustrated knob 13 also has a lower portion that defines the bore 14 including a top portion 18 configured for receiving the spring 15 and a lower portion 19 that extends below the spring 15 for more stably engaging the top section 12 of the shift lever 11. Notably, a scope of the present invention includes not only different spring shapes, but also the possibility of multiple springs on a single assembly . . . though multiple springs on a single assembly is not preferred since it is usually important to minimize components. The illustrated knob 13 includes a molded structural base of plastic (such as molded nylon or other structural material) and overmolded with a thermoplastic urethane or reaction-injection-molded urethane such as RRIM). However, it is contemplated that any material can be used for the knob 13 (including plastic, metal, composites, wood), and that it can be treated for aesthetics as desired (such as by using leather, chromed or plating materials or paints).

FIG. 6 shows an alternative construction where a shifter includes a shift lever 11B with top section 12B having an end slot 21B, and a mating knob 13B with protrusion 20B for retaining the spring 15B. The spring 15B is positioned to resiliently flex into the slot 21B as the knob 13B is pressed onto a top section 12B of the lever 11B.

FIGS. 7-7C show a modified retainer spring 15C, similar to spring 15, but with the barbs 25 extending from the end portion 26 of the spring 15C in orthogonal positions relative to the legs 16. Notably, in spring 15C the barbs 25 extend from the end portion 26 of the spring 15C, as compared to the barbs 17 extending from a root area of the legs 16 of the spring 15. Notably, a position of the barbs 17 makes them bite and retain the spring 15C within the knob 13 regardless of flexing movement of the spring legs 16.

A method of assembling a knob 13 onto a shift lever 11 comprises steps of providing a shifter having a shift lever 11 with a top section 12; providing a knob 13 with a bore 14 configured to receive the top section 12 for mounting thereon; and securing a spring 15 to one of the top section 12 and the knob 13, with the spring 15 being configured to fit within the bore 14 and grip a material of the knob 13 and extending longitudinally. The spring 15 has at least one leg portion 16 configured to flex and take up clearance between an outer surface of the top section 12 and an inner surface of the bore 14 to thus provide frictional retention of the knob 13 to the shift lever 11. The method further includes motivating with a single assembly motion the knob 13 and shift lever 11 together so that the top section 12 is positioned in the bore 14 with the spring 15 retaining the knob 13 and shift lever 11 together.

The present illustrated shift levers include a solid post or lever (11, 11B). However, it is contemplated that the present knob-and-lever combination can be readily adapted by a person skilled in the art of automotive shifter design for use in an automatic shifter (e.g., a shifter with serpentine shift pattern or a manual shifter) as well as adapted for a shifter knob with thumb button for manually or electrically actuating a pawl.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A shifter assembly for a vehicle, comprising:
a shifter having a shift lever with a top section having opposing flats that define uninterrupted planar surfaces;
a knob with a bore configured to receive the top section for mounting thereon; and
a spring configured to fit within the bore and grip a material of the knob and extending longitudinally, the spring having at least one leg portion configured to flex and take up clearance between an outer surface of the top section and an inner surface of the bore, and to provide frictional retention of the knob to the shift lever;
the spring being U-shaped and the at least one leg portion including opposing leg portions shorter than a length of the bore, with each leg portion having an outwardly-facing barb oriented to dig into a material of the knob when positioned in the bore, and each leg portion further having an arcuately bowed shape from end to end with an innermost curved surface slidingly engaging one of the flats on the shift lever to provide a frictional sliding retainer arrangement permitting sliding insertion and stable frictional retention and also permitting sliding removal without the use of separate fasteners or tools, with the arcuately bowed shape causing a lower insertion force and a very positive higher retention force of 4-10 times the lower insertion force.

2. The shifter assembly defined in claim 1, wherein the spring has at least one long bowed resilient leg.

3. The shifter assembly defined in claim 1, wherein the spring is U-shaped and has two bowed resilient legs.

4. The shifter assembly defined in claim 1, wherein the spring has barbs that engage a plastic material of the knob.

5. The shifter assembly defined in claim 1, wherein the spring forms a resilient leaf spring configured to hold itself within the bore and also to hold itself to the top section of the lever.

6. The shifter assembly defined in claim 1, wherein the spring is more than three times longer than wide.

7. The shifter assembly defined in claim 6, wherein the spring is at least five times longer than its width.

8. The shifter assembly defined in claim 1, wherein the spring is made from sheet metal.

9. The shifter assembly defined in claim 1, wherein the knob defines the bore and includes a top portion for receiving the spring and a lower portion that extends below the spring for more stably engaging the top section of the shift lever.

10. The shifter assembly defined in claim 1, wherein the spring consists of a U-shape with two opposing leg portions, each being arcuately and oppositely bowed and engaging opposite side surfaces of the top section of the shift lever.

11. A knob configured to be mounted to a shifter having a shift lever with a top section having opposing flats that define uninterrupted planar surfaces, comprising:
a knob with a bore configured to receive the top section for mounting thereon and a spring fit within the bore, the spring having retainers shaped to frictionally engage and grip a material of the knob, the spring further having at least one leg portion configured to flex and take up clearance between an outer surface of the top section and an inner surface of the bore, and to provide frictional retention of the knob to the shift lever:
the spring being U-shaped and the at least one leg portion including opposing leg portions shorter than a length of the bore, with each leg portion having an outwardly-facing barb oriented to dig into a material of the knob when positioned in the bore, and each leg portion further having an arcuately bowed shape from end to end with an innermost curved surface slidingly engaging one of the flats on the shift lever to provide a frictional sliding retainer arrangement permitting sliding insertion and stable frictional retention and also permitting sliding removal without the use of separate fasteners or tools, with the arcuately bowed shape causing a lower insertion force and a very positive higher retention force of 4-10 times the lower insertion force.

12. The knob defined in claim 11, wherein the spring has at least one long bowed resilient leg.

13. The knob defined in claim 11, wherein the spring is U-shaped and has two bowed resilient legs.

14. The knob defined in claim 11, wherein the spring has barbs that engage a plastic material of the knob.

15. The knob defined in claim 11, wherein the spring forms a resilient leaf spring configured to hold itself within the bore and also to hold itself to the top section of the lever.

16. The knob defined in claim 11, wherein the spring is more than three times longer than wide.

17. The knob defined in claim 16, wherein the spring is at least five times longer than its width.

18. The knob defined in claim 11, wherein the spring is made from sheet metal.

19. The knob defined in claim 11, wherein the knob defines the bore and includes a top portion for receiving the spring and a lower portion that extends below the spring for more stably engaging the top section of the shift lever.

* * * * *